(12) United States Patent
Talbot

(10) Patent No.: US 7,613,237 B1
(45) Date of Patent: Nov. 3, 2009

(54) BUILT-IN TEST FEATURE TO FACILITATE SYSTEM LEVEL STRESS TESTING OF A HIGH-SPEED SERIAL LINK THAT USES A FORWARDING CLOCK

(75) Inventor: Gerald Robert Talbot, Concord, MA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 660 days.

(21) Appl. No.: 11/033,758

(22) Filed: Jan. 13, 2005

(51) Int. Cl.
*H04B 3/46* (2006.01)

(52) U.S. Cl. ............ 375/226; 375/354; 375/219; 375/373; 324/763

(58) Field of Classification Search .......... 375/354, 375/226; 324/763
See application file for complete search history.

(56) References Cited

U.S. PATENT DOCUMENTS

| | | | | |
|---|---|---|---|---|
| 4,347,447 | A * | 8/1982 | Proebsting | 327/108 |
| 4,965,884 | A * | 10/1990 | Okura et al. | 375/354 |
| 5,485,490 | A * | 1/1996 | Leung et al. | 375/371 |
| 6,362,655 | B1 * | 3/2002 | Abraham et al. | 326/83 |
| 6,885,209 | B2 * | 4/2005 | Mak et al. | 324/763 |
| 7,012,983 | B2 * | 3/2006 | Buchwald et al. | 375/373 |
| 7,038,486 | B2 * | 5/2006 | Aoyama et al. | 326/30 |
| 2005/0163272 | A1 * | 7/2005 | Payne et al. | 375/354 |

OTHER PUBLICATIONS

U.S. Appl. No. 11/033,757, filed Jan. 13, 2005, Talbot.
U.S. Appl. No. 11/033,641, filed Jan. 13, 2005, Talbot.

"AMD-3181™ HyperTransport™ PCI-X® Tunnel Data Sheet", 24637 Rev. 3.02, Aug. 10, 2004, pp. 1-87.

* cited by examiner

*Primary Examiner*—Shuwang Liu
*Assistant Examiner*—Lihong Yu
(74) *Attorney, Agent, or Firm*—Manelli Denison & Selter PLLC; Leon R. Turkevich; Edward J. Stemberger

(57) ABSTRACT

A method of ensuring robust operation of a differential serial link is provided. The method provides a first integrated circuit having 1) a phase generator constructed and arranged to provide a programmable shift of a clock signal based on selective interpolating between first and second phases of the clock signal relative to a digital phase value, and 2) a transmit driver constructed and arranged to control, in a programmable manner, a differential voltage of digital data signals. A second integrated circuit is constructed and arranged to receive the clock and digital data signals sent by the first integrated circuit. The clock and digital data signals are sent substantially simultaneously through the link from the first integrated circuit to the second integrated circuit. It is determined whether the digital data signals can be sampled reliably by the second integrated circuit relative to the digital phase value. The clock signal is shifted, based on changing the digital phase value supplied to phase generator, towards a transition of the data signals until a failure is detected relative to an identified phase value such that the digital data signals cannot be sampled reliably by the second integrated circuit. Based on detection of the failure relative to the corresponding identified phase value, a time margin of the clock signal is established wherein the digital data signals can be sampled reliably by the second integrated circuit. A voltage margin of the differential voltage is also provided.

13 Claims, 4 Drawing Sheets

Differential voltage margining

BUILT-IN TEST FEATURE TO FACILITATE SYSTEM LEVEL STRESS TESTING OF A HIGH-SPEED SERIAL LINK THAT USES A FORWARDING CLOCK

BACKGROUND OF THE INVENTION

1. Field of the Invention

The present invention relates to test features built-in to a silicon device for testing high-speed serial links and, more particularly, to establish a differential signal (voltage) margin and time margin in a serial link to ensure a more robust link.

2. Background Art

When two components in a processor-based communications systems such as HyperTransport™ bus architectures are connected via a high-speed differential link, it is difficult to determine an operating margin of the link. As used herein the "margin" is an additional amount of time and/or voltage provided before the link fails. When a system is turned on and is operational, one does not know how much operating margin exists as a function, for example, of device aging, temperature, voltage, etc. Voltage may be manifested as noise or differences in phase may be manifested as jitter. Thus, it is difficult to establish the effective bit error rate of the link. Systems should be configured such that there is a low probability of errors occurring on the link. Since a portion of the jitter is random in nature, the only way to be certain of low error probability, without measuring the error rate, is to wait a very long time between failures. This is simply not practical in testing or characterization of new silicon.

SUMMARY OF THE INVENTION

There is a need for determining a failure point of a differential serial link and thus establish a voltage margin and a time margin in order to provide a more robust link.

This and other needs are attained by the present invention, where a method of determining a failure of a clock signal of a differential serial link is provided. A method of determining a failure of a clock signal of a differential serial link provides a first integrated circuit having a phase generator constructed and arranged to provide a programmable shift of a clock signal based on selective interpolating between first and second phases of the clock signal relative to a digital phase value. A second integrated circuit is constructed and arranged to receive the clock and digital data signals sent by the first integrated circuit. The clock and digital data signals are sent substantially simultaneously through the link from the first integrated circuit to the second integrated circuit. It is determined whether the digital data signals can be sampled reliably by the second integrated circuit relative to the digital phase value. The clock signal is shifted, based on changing the digital phase value supplied to phase generator, towards a transition of the data signals until a failure is detected relative to an identified phase value such that the digital data signals cannot be sampled reliably by the second integrated circuit. Based on detection of the failure relative to the corresponding identified phase value, a time margin of the clock signal is established wherein the digital data signals can be sampled reliably by the second integrated circuit.

In accordance with another aspect of the invention, a method of determining failure of differential signals on a differential serial link is provided. The method provides a first integrated circuit having a transmit driver constructed and arranged to control, in a programmable manner, a differential voltage of digital data signals. A second integrated circuit is constructed and arranged to receive the digital data signals sent by the transmit driver. In the second integrated circuit, it is determined whether the digital data signals can be sampled reliably. The differential voltage is dynamically changed, via the transmit driver, while maintaining a constant output impedance until a failure occurs such that the transmit driver transmits digital data signals that the second integrated circuit cannot sample reliably. Based on the differential voltage at which the failure occurs, a voltage margin of the differential voltage is established wherein the transmit driver transmits digital data signals that the second integrated circuit can sample reliably.

In accordance with yet another aspect of the invention, a method of ensuring robust operation of a differential serial link is provided. The method provides a first integrated circuit having 1) a phase generator constructed and arranged to provide a programmable shift of a clock signal based on selective interpolating between first and second phases of the clock signal relative to a digital phase value, and 2) a transmit driver constructed and arranged to control, in a programmable manner, a differential voltage of digital data signals. A second integrated circuit is constructed and arranged to receive the clock and digital data signals sent by the first integrated circuit. The clock and digital data signals are sent substantially simultaneously through the link from the first integrated circuit to the second integrated circuit. It is determined whether the digital data signals can be sampled reliably by the second integrated circuit relative to the digital phase value. The clock signal is shifted, based on changing the digital phase value supplied to phase generator, towards a transition of the data signals until a failure is detected relative to an identified phase value such that the digital data signals cannot be sampled reliably by the second integrated circuit. Based on detection of the failure relative to the corresponding identified phase value, a time margin of the clock signal is established wherein the digital data signals can be sampled reliably by the second integrated circuit. The differential voltage is dynamically changed, via the transmit driver, while maintaining a constant output impedance until a failure occurs such that the transmit driver transmits digital data signals that the second integrated circuit cannot sample reliably. Based on the differential voltage at which the failure occurs, a voltage margin of the differential voltage is established wherein the transmit driver transmits digital data signals that the second integrated circuit can sample reliably.

Additional advantages and novel features of the invention will be set forth in part in the description which follows and in part will become apparent to those skilled in the art upon examination of the following or may be learned by practice of the invention. The advantages of the present invention may be realized and attained by means of instrumentalities and combinations particularly pointed in the appended claims.

BRIEF DESCRIPTION OF THE DRAWINGS

Reference is made to the attached drawings, wherein elements having the same reference numeral designations represent like element elements throughout and wherein.

BEST MODE FOR CARRYING OUT THE INVENTION

Figure 1:
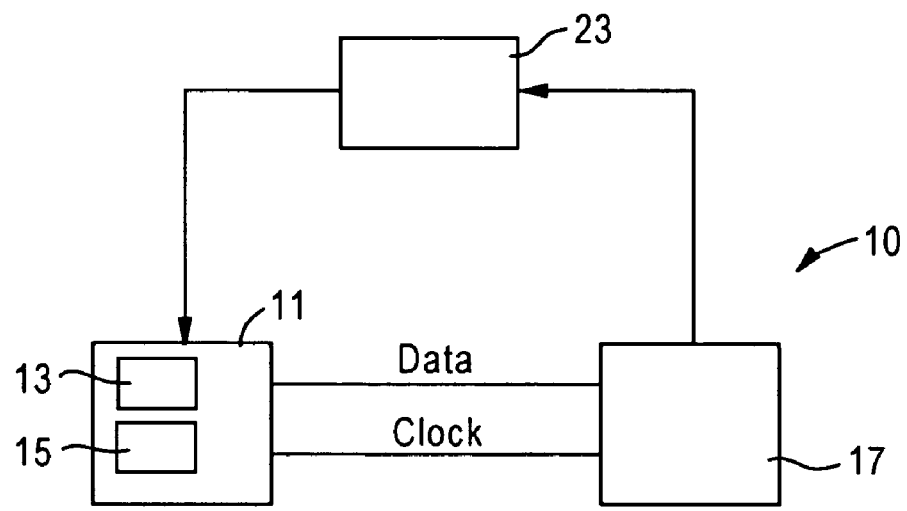
FIG. 1 is a block diagram of system having a first integrated circuit having a transmit driver and phase interpolator that sends data and clock signals to a second integrated circuit.

The disclosed embodiment is directed to a system having integrated circuits, for example, microprocessors that are linked via a high-speed link such as a HyperTransport™ link. With reference to FIG. 1, the system, generally indicated at 10, includes a first integrated circuit 11 that sends data and clock signals to a second integrated circuit 17. The first integrated circuit 11 includes voltage mode transmit driver 15 and a phase interpolator 13. The second integrated circuit 17 can be considered a receiver. A controller 23 supplies the test data to be transmitted by the transmit driver 15 and sets the voltage and phase values for respective voltage and time margining as will be explained below. The controller 23 executes software to determine if the data is received correctly or if an error has occurred, and to determine the voltage and time margins.

In accordance with the invention, the voltage mode transmit driver 15 is time margined and voltage margined. Thus, if an oscilloscope received an output of a transmit driver, one could see the output voltage amplitude change while the output is being margined as shown, for example, in FIG. 5. One could also see the phase between the clock and the data change while being margined, as for example, by the traces, such as A and B in FIG. 2.

Figure 6:
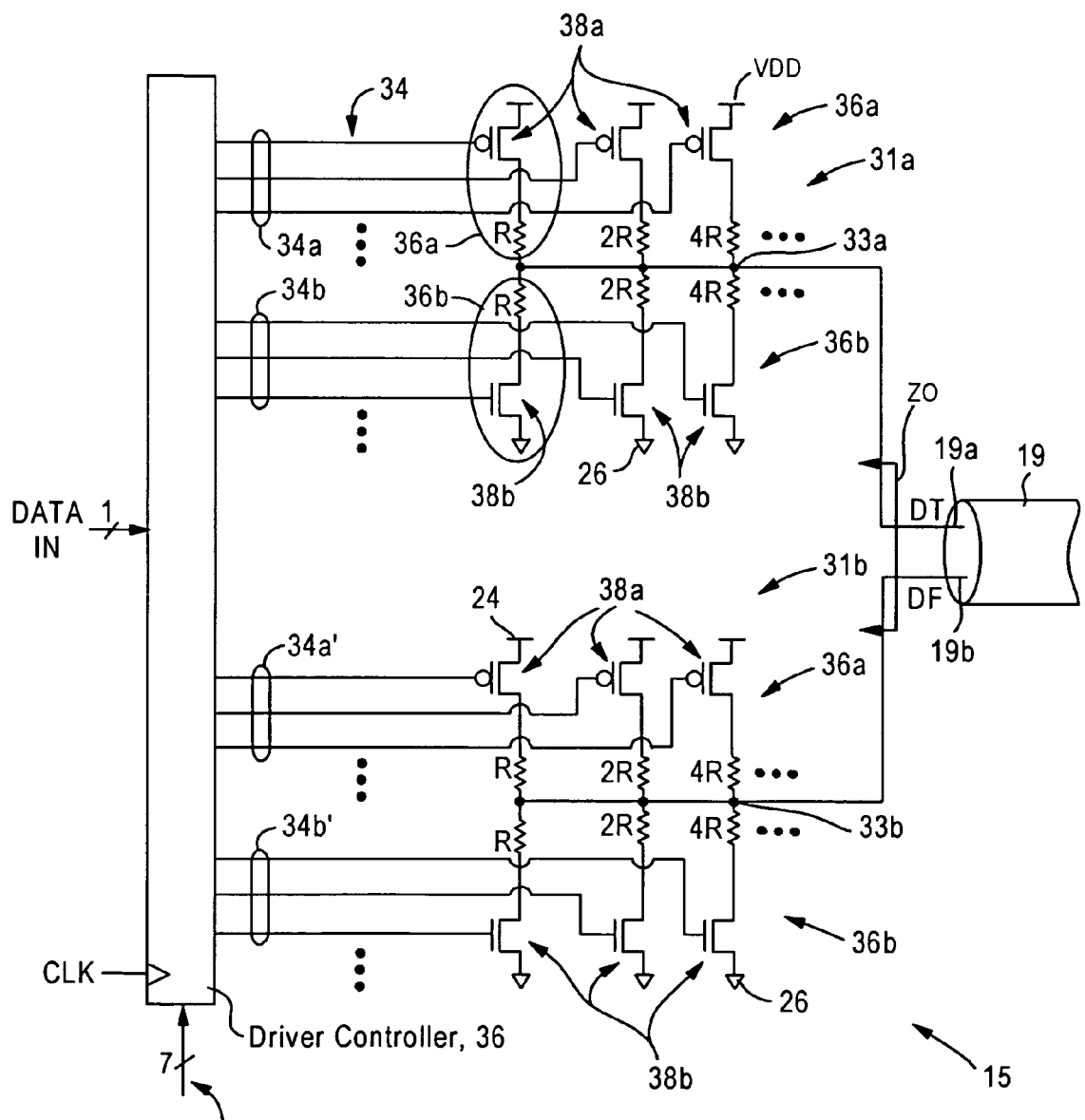
FIG. 6 is diagram illustrating a transmit driver according to an embodiment of the invention.

Time margining is specific to a style of serial interconnect called "source synchronous", which means that the clock and the data are transmitted substantially simultaneously from a transmit driver 15, for example, of the type shown in FIG. 6. When the clock and data arrive at the receiver 17, they arrive correlated to each other so that the clock that is received can be used to sample the data. Typically, nine data bits are transmitted simultaneously with one clock bit.

Figure 2:
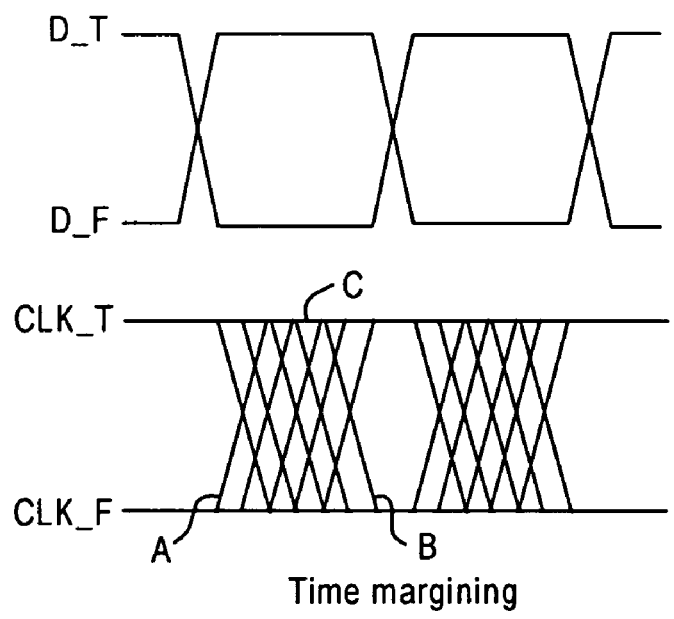
FIG. 2 shows time margining of clock signals relative to data signals according to an embodiment of the present invention.

With reference to FIG. 2, typically, the clock will transition when the data true (D_T) and data false (D_F) are both high or are both low. In FIG. 2, the clock true signal is CLK_T and the clock false signal is CLK_F. Location C in FIG. 2 would be the ideal instance to sample the data, such as, for example, where no failures would occur over a certain time. As the phase of the clock is moved towards the transition of the data, for example as indicated by traces A and B, the time until a failure occurs becomes shorter and shorter until a point where the data cannot be sampled correctly. FIG. 2 shows, in the X-direction, that there is a wide amount of margin (set-up and hold time) before and after the transition of the clock, which indicates that there is sufficient time to sample the data reliably and correctly. Thus, in accordance with the embodiment, time margining involves moving the phase of the clock with respect to the data in a programmable manner so that one can determine when the link fails. (e.g., the relative phase between the data transition and the clock transition at which point the reliability of the sampled values accurately reflecting the data values falls below a prescribed threshold). While the system is operating, a phase offset is applied to the clock to move the clock towards the data and the failure rate of the system is measured. Once the point at which the system starts failing is determined, the amount by which the clock is moved is the amount of time margin on the link.

Margin can be quantified as, for example, failures per hour, so in a typical test, the phase of the clock could be moved so that there is between 1 and 10 failures per hour. Thus, the amount of phase (time) margining indicates how much the phase between the clock and the data could change as a result of aging, voltage, temperature, etc. to get to that failure point. As an example, assume that the input receiver needs 100 picoseconds of set-up time to be sure of working reliably. If another 100 picoseconds of margin were provided, e.g., another 100 picoseconds are added, then link would be more robust. If, on the other hand, there were only 5 picoseconds of margin added, then the link would be considered a marginal link.

Figure 3:
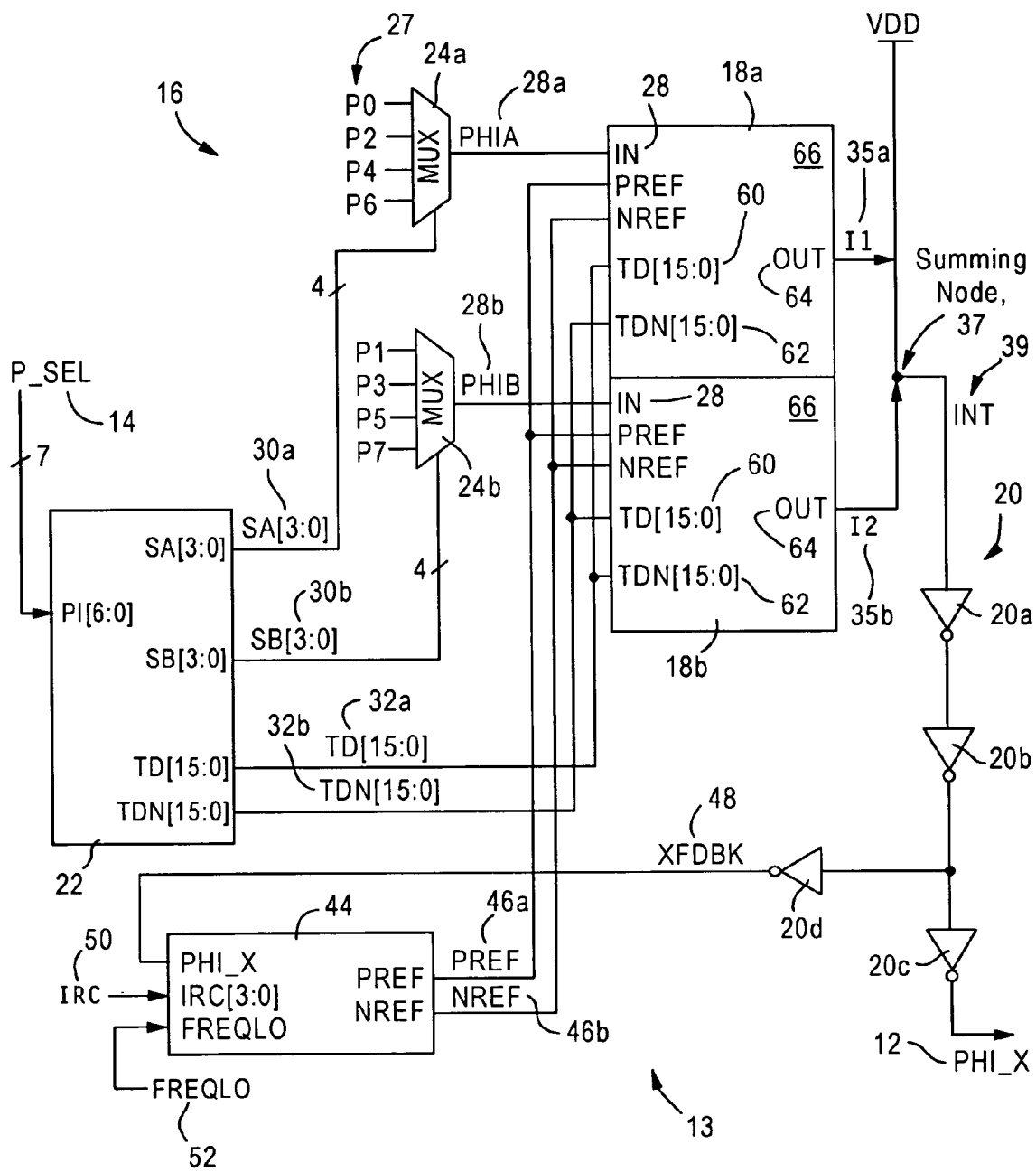
FIG. 3 is a block diagram of a phase interpolator for moving a clock signal relative to data signal according to an embodiment of the invention.

To implement time margining, a phase interpolator is preferably employed to change the phase of the clock relative to the data. An example of a phase interpolator, generally indicated at 13 in FIG. 3, is disclosed in commonly assigned, pending U.S. Application entitled, "Binary Controlled Phase Selector With Output Duty Cycle Correction", Ser. No. 11/033,641, the contents of which is hereby incorporated into the present specification by reference. The phase interpolator 13, as described in the above-mentioned patent application, enables precise control of phase selection in a digital phase selection circuit 16 implemented within an integrated circuit 11. In particular, the binary controlled phase interpolator 13 is configured for generating a clock signal (PHI_X) 12. The phase interpolator 13 generates the signal 12 to have a selected phase according to a phase selection value (P_SEL) 14, where the phase selection value 14 is a 7-bit digital value supplied, for example, by the controller 23, and that specifies one of 128 available digital phase increments across a period of a single clock cycle.

As described below, the phase interpolator 13 is configured for solving the problem of being able to precisely subdivide a reference clock into 128 equally spaced phase positions selected by binary control signals 14. Hence, the phase interpolator 13 can be used for digitally controlled phase alignment circuits that require the ability to continuously rotate an output phase of a given signal.

The phase interpolator 13 includes a selection circuit 16, binary weighted current sources 18a and 18b, and an amplifier circuit 20. The selection circuit 16, which includes a decoder 22 and multiplexers 24a and 24b, is configured for receiving a prescribed number of phase signals (P0-P7) 27 that represent respective equally-spaced phases of a clock signal. Each phase signal (e.g., P1) has a separation to an adjacent phase signal (e.g., P0 or P2) of one eighth (⅛) of a cycle (S=⅛). The phase signals (P1-P8) 27 are supplied, for example, by a poly-phase voltage-controlled oscillator (not shown), or a voltage-controlled delay line.

The selection circuit 16 is configured for selecting and outputting, from the phase signals P0 through P7 27, a first phase signal (PHIA) 28a and a second phase signal (PHIB) 28b, where the first phase signal (PHIA) 28a and the second phase signal (PHIB) 28b are adjacent to each other. In particular, each of the phase signals (PHIA) 28a and (PHIB) 28b have the same separation S of one eighth (⅛) of a cycle; hence, the phase signals (PHIA) 28a and (PHIB) 28b also are referred to herein as first and second adjacent phase signals, respectively.

The selection circuit 16 is configured such that the multiplexer 24a is configured for receiving the even index of the phase signals 27 (P0, P2, P4, P6), and the second multiplexer 24b is configured for receiving the odd index of the phase signals 27 (P1, P3, P5, P7).

The decoder 22 is configured for outputting 4-bit selection signals (SA) 30a and (SB) 30b to multiplexers 24a and 24b for selection of the first and second adjacent phase signals 28a and 28b, respectively. The decoder 22 is configured for identifying the appropriate selection signals 30a and 30b based on the received phase selection value (P_SEL) 14. In particular, the decoder 22 is configured for identifying the two phase signals 27 to which the phase selection value (P_SEL) 14 is bounded between; for example, if the phase signals P0, P1 and P2 represented respective digital phase values of "0", "15", and "31", and the phase selection value (P_SEL) 14 bade a value of "P_SEL=23", then the decoder 22 would identify that the phase selection value (P_SEL=23) is between the phase signals P1 (P1=15) and P2 (P2=31). In this case, the decoder 22 would output the selection signals 30a (SA="0010") and SB 30b (SB="0001") to the multiplexers 24a and 24b for selection of the phase signals P2 and P1, as the first and second phase signals PHIA 28a and PHIB 28b, respectively.

In addition, the decoder 22 is configured for identifying a digital interpolation control value (TD) 32a that identifies the difference between the received phase selection value (P_SEL) 14 (e.g., P_SEL=23) and the selected phase signals PHIA 28a (e.g., P2=31) and PHIB 28b (e.g., P1=15). In this case, the difference between the received phase selection value (P_SEL) 14 (e.g., P_SEL=23) and PHIB 28b (e.g., P1=15) is "8", hence the decoder 22 sets the digital interpolation control value (TD) 32a equal to "8". As described below, the digital interpolation control value (TD) 32a is implemented as a thermometer encoded group of control bits, where "thermometer encoding" refers to encoding a data value as a group of monotonically increasing bits.

In particular, in "thermometer encoding" a value is incremented by transitioning only one bit from a zero to a one value; hence, a four-bit thermometer-encoded code "0000" is incremented to values "1, 2, 3, 4" by incrementing a contiguous bit in the sequence "0001", "0011", "0111", and "1111", respectively. Hence, a thermometer-decoded value (e.g., TD 32a) is defined as having a first contiguous group of bits having a true value, wherein any bits within the digital interpolation control value (TD) 32a having a false value are contiguous and separated by the first contiguous group by a single transition ("01"). As described below, the use of thermometer encoding in the digital interpolation control value TD 32a enables each bit to control a corresponding current source module (not shown); hence, since every bit is considered a "least significant bit", use of thermometer decoding prevents rollover of a most significant bit and enables successive current source modules to be selectively enabled or disabled, resulting in a monotonic transition that prevents any discontinuity in current supply that may otherwise a voltage transient.

Hence, the decoder 22 outputs to the current sources 18a and 18b the digital interpolation control value TD 32a as a thermometer-encoded value. The decoder also outputs to the current sources 18a and 18b an inverse 32b (TDN) of the thermometer-encoded digital interpolation control value TD 32a.

In the above example it was assumed that there is no delay in the circuit 10; as apparent from the description below with respect to FIG. 4, however, a constant delay can be identified and added to the decoder 22 as a calibration value to ensure that the decoder 22 selects the selection signals 30a and 30b and the digital interpolation control values 32a and 32b, based on the identified delay, to ensure that the output signal (PHI_X) 12 matches the phase selection value (P_SEL) 14.

The binary weighted current sources 18a and 18b are configured for outputting first and second contribution currents I1 35a and I2 35b onto a summing node 37 based on the first and second adjacent phase signals PHIA 28a and PHIB 28b, respectively, and based on the digital interpolation control value TD 32a and its inverse TDN 32b. The first and second contribution currents I1 35a and I2 35b form at the summing node an interpolated signal INT 39 that is interpolated relative to the first and second adjacent phase signals PHIA 28a and PHIB 28b, the digital interpolation control value TD 32a, and its inverse 32b.

The phase interpolator 13 also includes an amplifier circuit 20, including at least amplifiers 20a, 20b, and 20c, that are configured for outputting the interpolated signal INT 39 as the phase-interpolated clock signal PHI_X 12. The voltage of the interpolated signal INT 39 is induced at the summing node 36 based on the intrinsic capacitance of the integrated circuit between the summing node 37 and the limiting amplifier 20a; in other words, the intrinsic capacitance can be modeled by a capacitor (not shown) having a first terminal coupled to the summing node 37 and a second terminal end coupled to ground.

Figure 4:
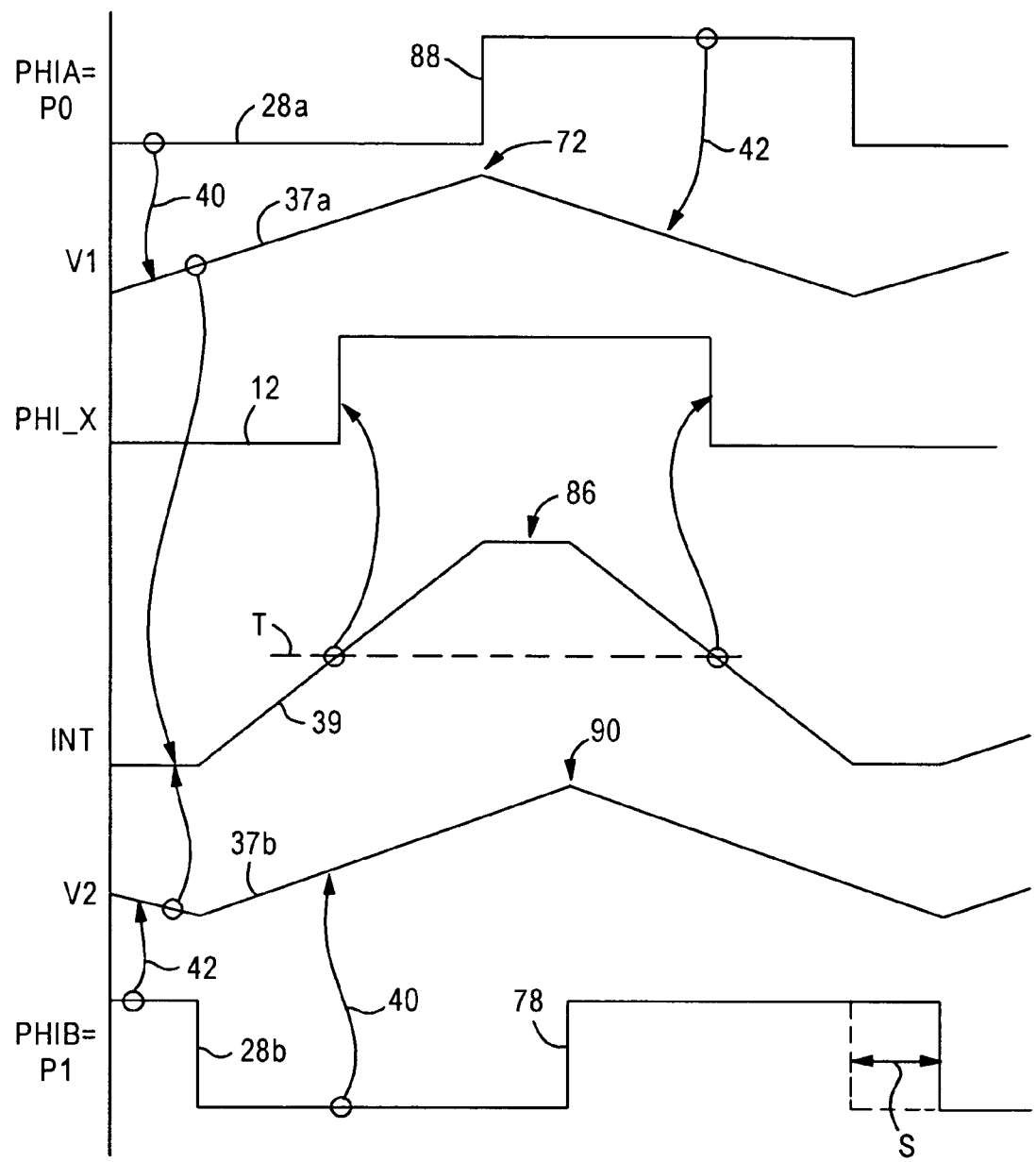
FIG. 4 is a diagram illustrating generation of an interpolated signal used to generate the phase-interpolated clock signal by the phase interpolator of FIG. 3.

The amplifier 20 includes a limiting amplifier 20a configured for outputting a voltage signal in response to an induced voltage of the interpolated signal INT 39 exceeding a prescribed threshold T, illustrated in FIG. 4. As recognized in the art, the threshold T for a CMOS inverter is nominally one half the reference supply voltage (VDD). Each amplifier 20a and 20b, implemented for example as a CMOS inverter, has a gain of about "10", such that the amplifiers 20a and 20b in series produce a gain of about "100". Hence, the amplifier 20b is configured for outputting the signal output of the amplifier 20a between prescribed voltage rails VDD and VSS, also referred to as first and second reference voltages. In other words, the amplifier 20b is able to generate a 1 volt (V) swing based on the amplifier 20a detecting a 0.01V volt above the threshold T. Hence, the second amplifier 20b ensures the output signal PHI_X 12 has a voltage swing between a first reference voltage VDD and a second reference voltage VSS, according to the phase selection value. The buffers 20c and 20d are configured for inverting the output signal with a unitary (e.g., "1") gain. Any variations in the threshold T (e.g., due to process variations) can be controlled by changing the slew rate of the contribution currents I1 35a and I2 35b, described below.

FIG. 4 is a diagram illustrating overall operation of the current sources 18a and 18b and the amplifier circuit 20 in generating the output signal PHI_X 12, according to an embodiment of the present invention. Assume in this example that the multiplexers 24a and 24b output the adjacent phase signals P0 and P1, respectively, and that the decoder 22 outputs a digital interpolation control value 32a having a value of "TD=8". Each of the current sources 18a and 18b is configured for supplying the corresponding contribution current I1 35a and I2 35b to the summing node 37 in response to deassertion of the corresponding adjacent phase signal 28a and 28b, illustrated as respective voltage signals V1 37a and V2 37b at node 37, for example as illustrated with respect to event 40. Each of the current sources 18a and 18b also is configured for draining (i.e., reducing) the corresponding contribution current I1 35a and I2 35b to the summing node 37 in response to assertion of the corresponding adjacent phase signal 28a and 28b, for example illustrated with respect to the respective voltage signals V1 37a and V2 37b at event 42. Each contribution current I1 32a and I2 32b is based on a sum total of current supplies and current drains by current source modules in each corresponding current source 18a and 18b. In addition, the current supply and current drain are performed at rates controlled by respective current control signals, described below.

The phase interpolator 13 of FIG. 3 also includes a current magnitude controller 44 configured for controlling the current magnitude by the current source 18a and 18b in sourcing or draining the respective currents I1 32a and I2 35b. In particular, the current magnitude controller 44 is configured for controlling the current magnitude supply by outputting analog current control signals PREF 46a and NREF 46b, to the current sources 18a and 18b, based on comparing the phase-interpolated clock signal XFDBK 48 output by the buffer 20d relative to a prescribed calibration value IRC 50. The prescribed calibration value IRC 50 is supplied by a calibration circuit (not shown) configured for calibrating the integrated circuit with respect to precision resistors that are externally coupled to the integrated circuit (i.e., off-chip) and having a tolerance of about one percent (1%).

The current control signal PREF 46a is configured for controlling the supply of current by each current source 18a and 18b relative to the digital interpolation control value TD 32a and TDN 32b as described below, at a corresponding slew rate. The current control signal NREF 46b is configured for controlling the drain of current by each corresponding current source 18a and 18b relative to the digital interpolation control value TD 32a and TDN 32b, at a corresponding slew rate.

Hence, the current magnitude controller 44 provides a feedback control system for adjusting the current sources 18a and 18b using the current control signals PREF 46a and NREF 46b based on the feedback signal 48, and based on the calibration value IRC 50. Hence, the current magnitude controller 44 is configured for controlling a duty cycle of the phase-interpolated clock signal 39 of FIG. 4 based on the controlling the first and second current control signals PREF 24a and NREF 46b.

The current magnitude controller 44 also is configured for setting the first and second slew rates to a high slew rate or a low slew rate based on a frequency selection input signal FREQLO 52. Hence, the controller 44 is configured for setting the current control signals PREF 24a and NREF 46b for a relatively high slew rate in response to detecting the frequency selection input signal FREQLO 52 indicating a high frequency, while maintaining a 50% duty cycle. Conversely, the controller 44 is configured for setting the current control signals PREF 24a and NREF 46b for a relatively low slew rate in response to detecting the frequency selection input signal FREQLO 52 indicating a low frequency, while maintaining a 50% duty cycle.

Each current source 18 (e.g., 18a and 18b of FIG. 3) includes a plurality of current source modules 66. Each current source module 66 is configured for selectively contributing to the corresponding contribution current I 35 (e.g., I1 35a and I2 35b of FIG. 3) based on the corresponding adjacent phase signal 28, the current control signals PREF 46a and NREF 46b, a corresponding control bit (e.g., TD[0]) 60 from the thermometer-decoded digital interpolation control value TD 32a, plus the corresponding control bit (e.g., TDN [0]) 62 from the inverse TDN 32b. Hence, each current source module 66 is selectively enabled based on the corresponding control bit 60 being asserted (IE=1) and the inverse control bit being deasserted (IEN=0). As apparent from above, the current source modules 66 of the current source 18a receive the corresponding control bit 60 from the digital interpolation control value TD 32a, and the corresponding inverse control bit 62 from the inverse control value TDN 32b, whereas the current source modules 66 of the current source 18b receive the corresponding control bit 60 from the inverse digital interpolation control value TDN 32b, and the corresponding inverse control bit 62 from the digital interpolation control value TD 32a.

Consequently, each current control module 66, if enabled by its corresponding inverse enable signal 62 (IEN=0), sources (i.e., supplies) current to the summing node 36 at the slew rate controlled by the current control signal PREF 46a, based on the corresponding input signal IN 28 being deasserted; each current control module 66 that is enabled (IE=1) drains (i.e., removes) current from the summing node 36 at the slew rate controlled by the current control signal NREF 46b, based on the corresponding input signal IN 28 being asserted.

As apparent from the foregoing, the combination of current modules 66 in each current source 18 enables a linear increase or decrease in the current supply I 35 by the current source 18 to its corresponding output node 64 based on the number of its internal current source modules 66 that are enabled by the respective control bits 60 of the thermometer-decoded digital interpolation control values TD 32a (for current supply 18a), or conversely the inverse bits 62 of the inverse value TDN 32b (for current supply 18b). Consequently, the interpolation control values TD 32a and TDN 32b are used to control the weighting of the adjacent phase signals PHIA 28a and PHIB 28b in determining an interpolated value 39. In addition, the current control signals PREF 46a and PREF 46b are used to control the slew rate of the current signals 35a and 35b in order to maintain a 50% duty cycle, as well as select between a high frequency clock and a low frequency clock.

As illustrated in FIG. 4, an equal contribution by both current sources 18a and 18b based on the interpolation control value 32a having an equal weighting relative to the inverse 32b (e.g., TD=0000000011111111 and TDN=1111111100000000) results in an interpolated signal 39 having a voltage peak 86 equidistant between the peaks 88 and 90 of the signals V1 and V2, respectively, and the rising edges of the phase signals 28a and 28b, respectively. An unequal weighting, due to a change in the interpolation control values TD 32a and TDN 32b, will skew the interpolated signal 39 toward the higher-weighted phase signal 28a or 28b, causing a corresponding phase shift in the output signal PHI_X 12.

Hence, a digital precise interpolation control can be implemented without introducing voltage spikes due to transients that may be interpreted as a runt pulse by pulse detection circuitry. As described above, the decoder 22 in implementation will adjust for the delay introduced between the peak 86 and the intended phase shift, ensuring that the output signal PHI_X 12 will match the phase selection value P_SEL 14. In addition, the current magnitude controller 44 adjusts the control signals 46a and 46b to ensure precise alignment of the output signal PHI_X 12 relative to the amplifier threshold T.

Figure 5:
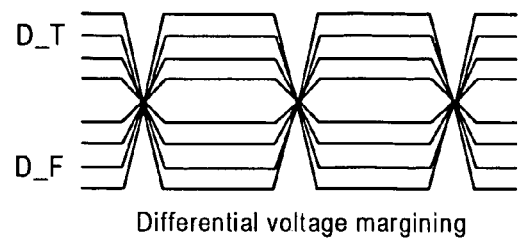
FIG. 5 shows differential voltage margining according to an embodiment of the invention.

Now turning to FIGS. 5 and 6, voltage margining with be explained. In FIG. 5, a differential amplitude (voltage) can be changed at the transmit driver 15 to provide voltage margining of the system (e.g., how much amplitude the receiver 17 receives in order to correctly sense a "1" or a "0").

A transmit driver 15 that is suitable for providing voltage margining is disclosed in commonly assigned, pending U.S. Application entitled, "Voltage Mode Transceiver Having Programmable Voltage Swing And External Reference-Based Calibration", Ser. No. 11/033,757, the contents of which is hereby incorporated into the present specification by reference. An example of such a voltage mode transmit driver 15 is shown in FIG. 6, according to an embodiment of the present invention.

The voltage mode transmit driver 15 is part of an integrated circuit chip and includes a first circuit 31a and a second circuit 30b. The circuits 31a and 31b are configured for outputting the respective differential signals DT and DF via signal nodes 33a and 33b onto the differential signal transmission lines 19a and 19b (link 19), respectively, to a receiver 17.

The voltage mode transmit driver 15 also includes a driver controller 36 configured for outputting gate signals 34 in response to a data input (DATA IN), a clock signal, and the binary code 21 generated by a calibration circuit (not shown). In particular, each of the circuits 31a and 31b is configured for receiving gate signals 34 that control the voltage value of the differential signals DT and DF, as well as the output impedance ZO.

As shown in FIG. 6, each circuit (31a and 31b) includes pull-up circuits 36a and pull-down circuits 36b. Each pull-up circuit 36a and pull-down circuit 36b of the circuit 31a is configured for selectively changing the voltage DT and output impedance on the corresponding signal node 33a based on its corresponding pull-up gate signal 34a and pull-down gate signal 34b, respectively. Similarly, each pull-up circuit 36a and pull-down circuit 36b of the circuit 31b is configured for selectively changing the voltage DF and output impedance on the corresponding signal node 33b based on its corresponding pull-up gate signal 34a' and pull-down gate signal 34b', respectively.

As illustrated in FIG. 6, each pull-up circuit 36a includes a P-FET transistor 38a, and each pull-down circuit 38b includes an N-FET transistor. Hence, each P-FET transistor 38a allows current to pass through a corresponding connected resistor until the corresponding pull-up gate signal 34 is asserted, at which point the P-FET transistor 38a disables current from passing through the corresponding resistor. Conversely, each N-FET transistor 38b does not allow current to pass through a corresponding connected resistor until the corresponding pull-up gate signal 34 is asserted.

As apparent from the foregoing, since the signals DT and DF are logical complements of each other, the pull-up gate signals 34a are logical complements of the respective pull-up gate signals 34a', and the pull-down gate signals 34b are logical complements of the respective pull-down gate signals 34b'. Hence, the driver controller 36 can invert the differential signals DT and DF, in response to a change in the DATA IN signal and synchronous with the clock signal CLK, merely by inverting all of the gate signals 34 simultaneously.

As illustrated in FIG. 6, the pull-up circuits 36a and the pull-down circuits 36b include resistors having respective binary weighted resistance values relative to each other (R, 2R, 4R, etc.). In other words, for each successive pull-up circuit 36a or pull-down circuit 36b, the corresponding pull-up/pull-down resistance has twice the resistance value as the resistance of the previous pull-up circuit 36a or pull-down circuit 36b. An exemplary resistance value is R=62.5 ohms.

The use of binary weighted resistance values enables the driver controller 36 to selectively connect the pull-up circuits 38a and/or pull-down circuits 38b as needed, based on the respective pull-up gate signals 34a, 34a' and/or pull-down gate signals 34b, 34b', in order to provide additional resistors in parallel to form a resistor divider network in order to change the output impedance ZO. Hence, the output impedance ZO between the supply voltage node VDD and the signal node 33a or 34b is based on the parallel combination of the resistance provided by the activated pull-up circuits 38a. Similarly, the output impedance ZO between the signal node 33a or 33b and the base voltage (e.g., ground) 26 is based on the parallel combination of the resistances provided by the activated pull-down circuits 36b.

As noted above, a differential amplitude (voltage) can be changed at the transmit driver 15 to provide voltage margining of a system. With reference to pull-up transistors 36a, if transistors containing resistor R and resistor 2R are both turned on, and pull-down transistor 36b containing resistors R and 2R are both turned off a certain voltage is defined. Then, if transistor 36a containing resistor 2R is turned off and transistor 36b containing resistor 2R is turned to ground, the voltage of the system is reduced to a voltage less than the certain voltage, without changing the impedance ZO. This is due to the parallel combination of R and 2R, whether 2R is connected to ground or to a supply voltage. In another example, a maximum voltage is defined when all pull-up transistors 36a are turned on and all the pull-down transistors 36b are tuned off. The voltage would be reduced from the maximum voltage, while maintaining the impedance, by turning off the pull-up transistors 36a containing 2R and 4R and turning on the pull-down transistors 36b containing 2R and 4R, since a voltage divider circuit is created.

Thus, in the examples, the source impedance ZO of the driver 15 is not changed, but the differential voltage swing of the transmit driver 15 is changed in a programmable manner to determine the voltage at which errors occur more frequently, e.g., the amplitudes at which it is difficult to correctly sense a "1" or a "0". As an example, assume that it is determined that the input receiver 17, receiving signals from the transmit driver 15, needs X volts to be sure of correctly sensing a "1". Thus, if an additional Y volts of margin is ensured at the transmit driver 15, the link would be more robust. The amount by which the voltage is changed, e.g., Y volts, is the amount of voltage margin on the link.

Since a differential voltage is being generated, zero differential means that DT and DF are both at half of the supply voltage VDD. When voltage margining the link, one does not want to generate anything less than zero differential voltage. Thus, node 33a need not go below half of the supply voltage. Hence, the number of resistors that need to be turned on to ground is relatively few since the voltages need to move less than half of the voltage swing.

Thus, the embodiment provides a method of stress testing wherein the two variables of voltage and time are varied against each other to cause a failure of the link after some time period. Thus, by measuring the time between failures at different levels of receive data when running a stress test on the link, bit error failure rates can be calculated and extrapolated. In addition, the method can be used to determine when a link fails more or less often, and statistical analysis can be employed to establish an acceptable margin.

The method described above can be employed during initial validation of the silicon, during, initial bring-up and characterization of the silicon, and/or as a built-in self test feature in a shipped product employing the silicon, without the use of external test equipment. For example, at a customer's site, a diagnostic could be run on the system and the link could be margined and the error rate could be measured as the link is margined.

While this invention has been described with what is presently considered to be the most practical preferred embodiment, it is to be understood that the invention is not limited to the disclosed embodiments, but, on the contrary, is intended to cover various modifications and equivalent arrangements included within the spirit and scope of the appended claims.

What is claimed is:

1. A method of determining a failure of a clock signal of a differential serial link, the method including:
   providing a first integrated circuit having a phase generator constructed and arranged to provide a programmable shift of a clock signal based on selective interpolating between first and second phases of the clock signal relative to a digital phase value, providing a second integrated circuit constructed and arranged to receive the clock and digital data signals sent by the first integrated circuit, sending the clock and digital data signals substantially simultaneously through the link from the first integrated circuit to the second integrated circuit, determining, whether the digital data signals can be sampled reliably by the second integrated circuit relative to the digital phase value, shifting the clock signal, based on changing the digital phase value supplied to the phase generator to a selected one of a plurality of digital phase increments across a period of a single clock cycle, towards a transition of the data signals until a failure is detected relative to an identified phase value such that the digital data signals cannot be sampled reliably by the second integrated circuit, and based on the detection of the failure relative to the corresponding identified phase value, establishing a time margin of the clock signal wherein the digital data signals can be sampled reliably by the second integrated circuit.

2. The method of claim 1, wherein the step of providing a phase generator includes providing a binary phase generator that enables programmable control of the clock signal in a digital phase selection circuit implemented within the first integrated circuit.

3. The method of claim 1, wherein the establishing step includes establishing the time margin as the amount of time that the clock signal was shifted.

4. A method of determining failure of digital data signals on a differential serial link, the method including:

providing a first integrated circuit having a transmit driver constructed and arranged to control, in a programmable manner, a differential voltage of digital data signals, providing a second integrated circuit constructed and arranged to receive the digital data signals sent by the transmit driver, determining, in the second integrated circuit, whether the digital data signals can be sampled reliably, dynamically changing the differential voltage while maintaining a constant output impedance, by the transmit driver, until a failure occurs such that the transmit driver transmits digital data signals that the second integrated circuit cannot sample reliably, and based on the differential voltage at which the failure occurs, establishing a voltage margin of the differential voltage wherein the transmit driver transmits digital data signals that the second integrated circuit can sample reliably, wherein the step of providing a transmit driver includes providing a transmit driver comprising:

(1) first and second circuits configured for outputting respective first and second differential signals via respective first and second signal nodes onto first and second differential signal transmission lines having a transmission line impedance, the first and second circuits each comprising:

(a) pull-up circuits configured for selectively changing an impedance on the corresponding signal node of the corresponding circuit based on respective pull-up gate signals, the pull-up circuits having respective binary weighted resistance values relative to each other, (b) pull-down circuits configured for selectively changing an impedance on the corresponding signal node of the corresponding circuit based on respective pull-down gate signals, the pull-down circuits having the respective binary weighted resistance values relative to each other, and (2) a driver controller configured for controlling each of the pull-up gate signals and the pull-down gate signals.

5. The method of claim 4, wherein the step of changing the differential voltage includes first controlling the driver such that all pull-up circuits are turned on and all pull-down circuits are turned off thereby establish a maximum differential voltage swing, and thereafter, turning off certain of the pull-up circuits and turning on corresponding pull-down circuits thereby establishing an voltage divider circuit whereby a differential swing voltage is established that is less than the maximum differential swing voltage.

6. The method of claim 4, wherein the establishing step includes establishing the voltage margin as the amount by which the differential voltage was changed.

7. A method of ensuring robust operation of a differential serial link, the method including:

providing a first integrated circuit having 1) a phase generator constructed and arranged to provide a programmable shift of a clock signal based on selective interpolating between first and second phases of the clock signal relative to a digital phase value, and 2) a transmit driver constructed and arranged to control, in a programmable manner, a differential voltage of digital data signals, providing a second integrated circuit constructed and arranged to receive the clock and digital data signals sent by the first integrated circuit, sending the clock and digital data signals substantially simultaneously through the link from the first integrated circuit to the second integrated circuit, determining whether the digital data signals can be sampled reliably by the second integrated circuit relative to the digital phase value, shifting the clock signal, based on changing the digital phase value supplied to the phase generator to a selected one of a plurality of digital phase increments across a period of a single clock cycle, towards a transition of the data signals until a failure is detected relative to an identified phase value such that the digital data signals cannot be sampled reliably by the second integrated circuit, based on the detection of the failure relative to the corresponding identified phase value, establishing a time margin of the clock signal wherein the digital data signals can be sampled reliably by the second integrated circuit, dynamically changing the differential voltage while maintaining a constant output impedance, by the transmit driver, until a failure occurs such that the transmit driver transmits digital data signals that the second integrated circuit cannot sample reliably, and based on the differential voltage at which the failure occurs, establishing a voltage margin of the differential voltage wherein the transmit driver transmits digital data signals that the second integrated circuit can sample reliably.

8. The method of claim 7, wherein the step of providing a phase generator includes providing a binary phase generator that enables programmable control of the clock signal in a digital phase selection circuit implemented within an the first integrated circuit.

9. The method of claim 7, wherein the step of establishing a time margin includes establishing the time margin as the amount of time that the clock signal was shifted.

10. The method of claim 7, wherein the step of providing a transmit driver includes providing a transmit driver comprising:
- (1) first and second circuits configured for outputting respective first and second differential signals via respective first and second signal nodes onto first and second differential signal transmission lines having a transmission line impedance, the first and second circuits each comprising:
  - (a) pull-up circuits configured for selectively changing an impedance on the corresponding signal node of the corresponding circuit based on respective pull-up gate signals, the pull-up circuits having respective binary weighted resistance values relative to each other,
  - (b) pull-down circuits configured for selectively changing an impedance on the corresponding signal node of the corresponding circuit based on respective pull-down gate signals, the pull-down circuits having the respective binary weighted resistance values relative to each other, and
- (2) a driver controller configured for controlling each of the pull-up gate signals and the pull-down gate signals.

11. The method of claim 10, wherein the step of changing the differential voltage includes first controlling the driver such that all pull-up circuits are turned on and all pull-down circuits are turned off thereby establish a maximum differential voltage swing, and thereafter, turning off certain of the pull-up circuits and turning on corresponding pull-down circuits thereby establishing an voltage divider circuit whereby a differential swing voltage is established that is less than the maximum differential swing voltage.

12. The method of claim 7, wherein the step of establishing a voltage margin includes establishing the voltage margin as the amount by which the differential voltage was changed.

13. A system for ensuring robust operation of a differential serial link, the system comprising:

- a first integrated circuit having 1) a phase generator constructed and arranged to provide a programmable shift of a clock signal based on selective interpolating between first and second phases of the clock signal relative to a digital phase value, and 2) a transmit driver constructed and arranged to control, in a programmable manner, a differential voltage of digital data signals,
- a second integrated circuit constructed and arranged to receive the clock and digital data signals sent by the first integrated circuit, and
- a controller constructed and arranged to 1) determine whether the digital data signals can be sampled reliably by the second integrated circuit relative to the digital phase value, 2) shift the clock signal, based on changing the digital phase value supplied to the phase generator to a selected one of a plurality of digital phase increments across a period of a single clock cycle, towards a transition of the data signals until a failure is detected relative to an identified phase value such that the digital data signals cannot be sampled reliably by the second integrated circuit, 3) based on the detection of the failure relative to the corresponding identified phase value, establish a time margin of the clock signal wherein the digital data signals can be sampled reliably by the second integrated circuit, 4) dynamically change the differential voltage while maintaining a constant output impedance, by the transmit driver, until a failure occurs such that the transmit driver transmits digital data signals that the second integrated circuit cannot sample reliably, and 5) based on the differential voltage at which the failure occurs, establish a voltage margin of the differential voltage wherein the transmit driver transmits digital data signals that the second integrated circuit can sample reliably.

* * * * *